Aug. 12, 1969   J. F. CHMELA   3,460,724
CLOSURE CAP
Filed Nov. 14, 1967   2 Sheets-Sheet 1
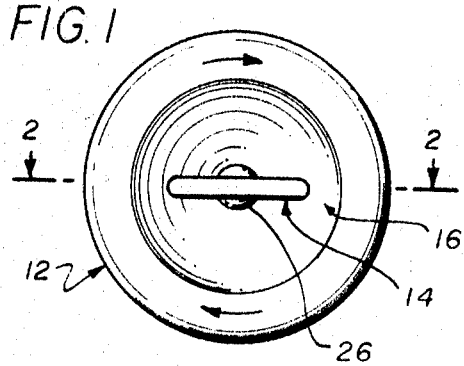
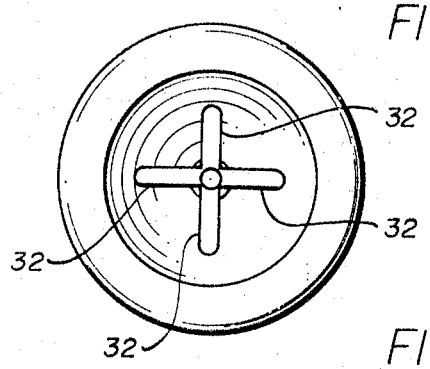
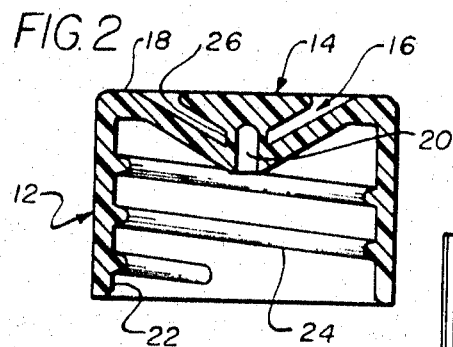
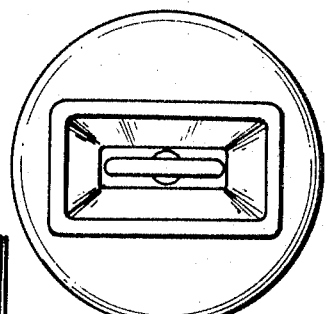
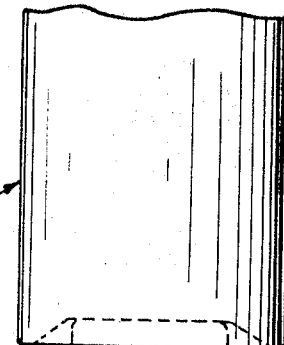
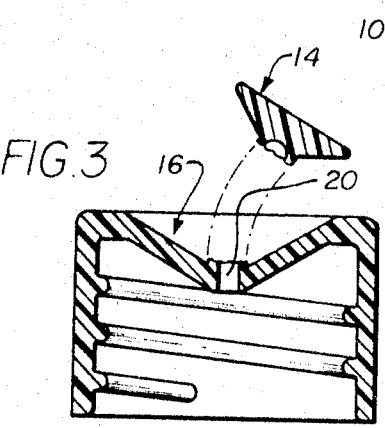
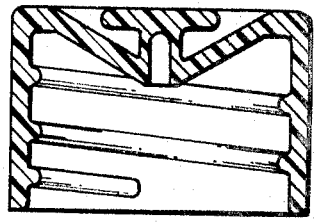
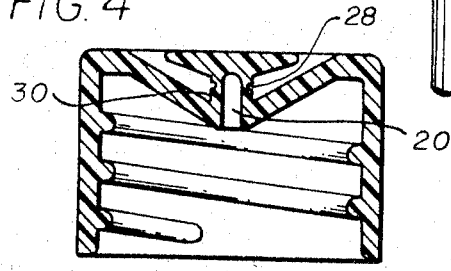
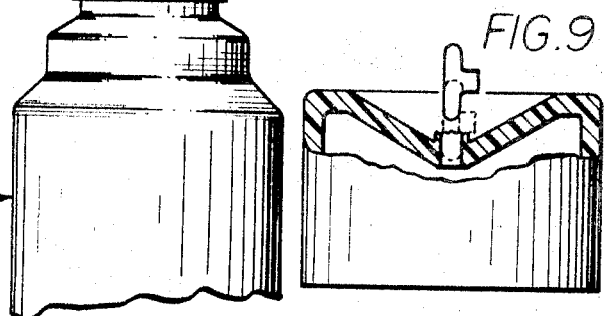
INVENTOR.
JOHN F. CHMELA
BY
Dominik, Stein & Knechtel
ATTYS.

Aug. 12, 1969  J. F. CHMELA  3,460,724
CLOSURE CAP
Filed Nov. 14, 1967  2 Sheets-Sheet 2
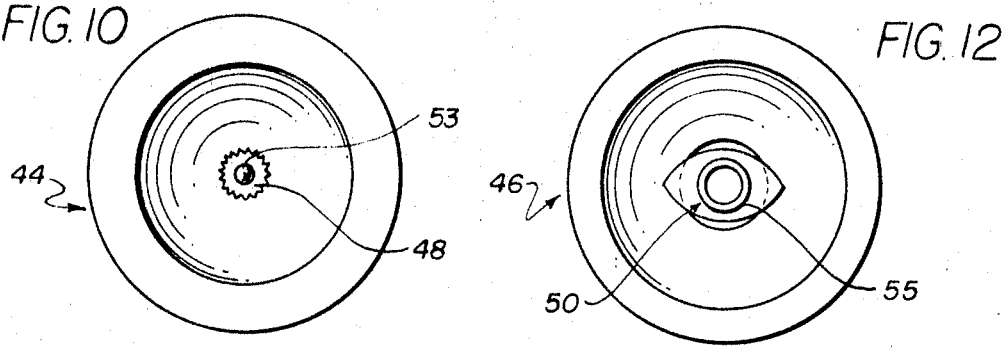
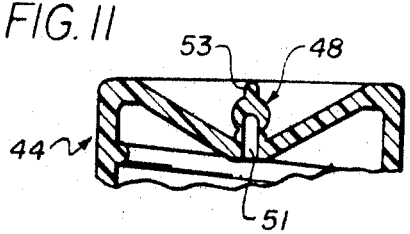
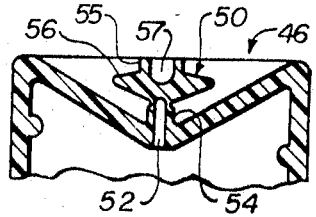
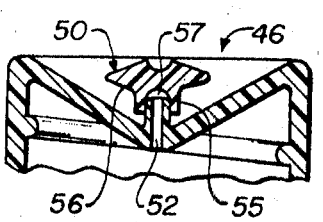
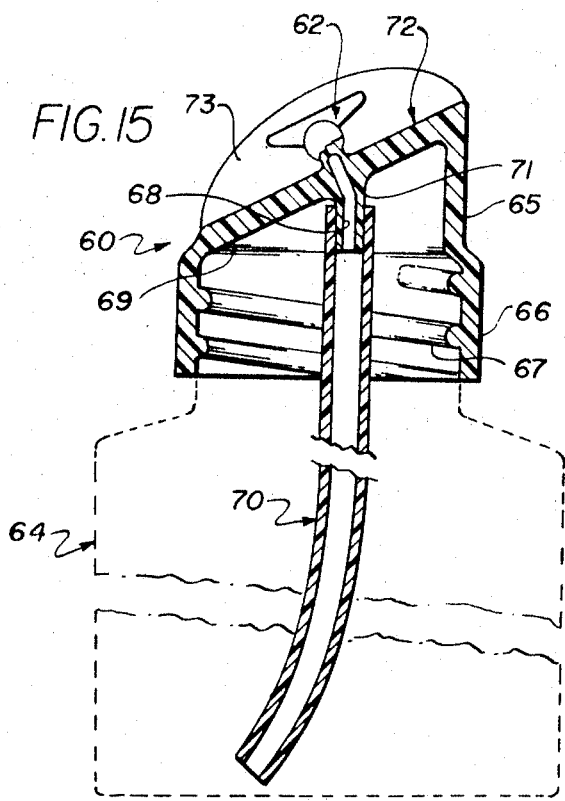
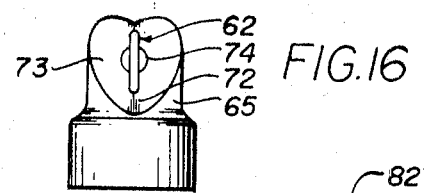
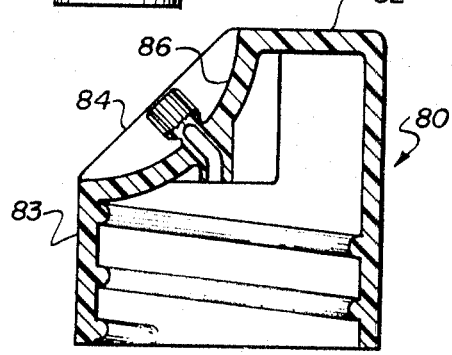
INVENTOR.
JOHN F. CHMELA
BY
Dominick, Stein & Knechtel
ATTYS.

United States Patent Office 3,460,724
Patented Aug. 12, 1969

3,460,724
CLOSURE CAP
John F. Chmela, 7256 Davis St.,
Morton Grove, Ill. 60053
Filed Nov. 14, 1967, Ser. No. 682,932
Int. Cl. B65d 47/06
U.S. Cl. 222—541                                8 Claims

ABSTRACT OF THE DISCLOSURE

This invention relates to a closure cap which is molded as an integral unit preferably of plastic, and which has an opener contained within a recessed cavity formed in one of its walls. The cavity preferably is of a depth such that the opener does not project beyond the plane of the wall in which it is contained. The opener is easily and quickly removed simply by twisting it, or otherwise breaking it, with the fingers to provide a dispensing aperture in the cap. The opener also may be formed in a fashion such that it can be used to re-seal the dispensing aperture in the cap, if desired.

---

This invention relates to containers for fluids such as detergents and the like and, more particularly, it relates to a closure cap for said containers.

Liquid detergents and the like generally are packaged in plastic bottles and are dispensed therefrom by the user. These bottles usually are provided with closure caps of a design such that the product can be dispensed from them without the necessity of removing the cap. For example, many of the caps presently being used are of the "snip-off" type, that is, the cap has an elongated, tapered tip on it which normally is closed. The end of the tip is merely snipped off, to permit the product to be dispensed. Others are of the "flip-cap" types, that is, the cap has a small pour spout formed in it which is closable with a flip-open pour spout cap. Numerous other arrangements also are used.

It is preferred to fabricate the bottles of plastic since the cost of plastic bottles is much less than bottles of glass or other similar materials. Furthermore, the plastic bottles have the advantage of being substantially break-proof. At least, these bottles will withstand considerably more abuse than those fabricated of glass. Accordingly, housewives generally prefer them.

While these plastic bottles have the above, as well as other advantages, they do present a problem when they are packaged for shipment, particularly when supplied with one of the closure caps of the above-mentioned types. It has been found that numerous ones of the bottles are damaged so that the product leaks from them during shipment, as a result of the cap on one of the bottles puncturing a hole in the bottom of another one of the bottles stacked on top of it. This is due to the fact that the surface area of the caps does not present sufficient support surface for the bottle placed on top of it, and when the shipping carton in which they are packaged is dropped, the weight of the bottled product in combination with the impact force causes the cap to pierce the bottom of the bottle. The same results can occur if the bottles are stored for any length of time, due simply to plastic flow. This problem has been solved by most manufacturers or packagers, by placing a flat sheet of cardboard or the like as a spacer between the layers of bottles in the shipping carton. While this expedient works, it substantially increases packaging costs. The industry therefore has been seeking an improved cap for the bottles which will overcome the above problem but which still can be easily adapted to dispense the product without the necessity of removing it.

Accordingly, it is an object of the present invention to provide an improved closure cap.

Another object is to provide improved closure caps which can be easily and inexpensively molded.

Still another object is to provide improved closure caps for containers which are normally closed and can be easily and quickly adapted to dispense the product from the container without the need of removing the cap. In this respect, it is further contemplated that the cap can be adapted to dispense the product from the container, without the need of additional opening means such as a knife, scissors or the like.

A still further object is to provide improved closure caps for containers of the above type which provide a substantial support surface so that another container can be stacked atop it without damage to the latter during shipment and/or storage.

A still further object is to provide improved closure caps of the above type having a recessed cavity in its top wall which causes the excess product to flow back into the container. In this respect, it is futher contemplated that the recessed cavity will provide a substantial drip-proof cap.

Still another object is to provide improved normally-closed closure caps for containers having an opener integrally formed with it which is breakable and removable, as by merely twisting it with two fingers, so that the need to use additional opening means such as a knife or scissors to provide an aperture in the cap for dispensing the product contained therein is eliminated.

Still another object is to provide improved closure caps of the last-mentioned type, wherein the opener is adapted to be used to re-seal the aperture formed in the cap.

Still another object is to provide a closure cap and a container adapted to dispense a product from said container in the form of a spray by squeezing said container.

Other objects of the invention will in part be obvious and will in part appear hereinafter.

The above objectives are accomplished with a closure cap which is molded as an integral unit, preferably of plastic, and which has an opener, hereinafter generally referred to as a twist-off opener, contained within a recessed cavity formed in one of its walls. The cavity preferably is of a depth such that the twist-off opener does not project beyond the plane of the wall in which it is contained, so that it is protected from accidental removal. The twist-off opener is easily and quickly removed simply by twisting it with the fingers to provide a dispensing aperture in the cap, and may be formed in a fashion such that it can be used to re-seal the aperture in the cap, if desired.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawing in which:

FIG. 1 is a top plan view of a closure cap exemplary of the invention;

FIG. 2 is a sectional view taken along lines 2—2 of FIG. 1;

FIG. 3 is a sectional view like FIG. 2, illustrating the manner in which the twist-off opener is removed, to provide a dispensing orifice in the cap;

FIG. 4 is a sectional view like FIG. 2, illustrating an alternative construction of thec losure cap;

FIG. 5 is a top plan view of a closure cap exemplary of still another embodiment of the invention;

FIG. 6 is a partial side plan view, illustrating the manner in which one container can be stacked atop another container;

FIG. 7 is a top plan view of a closure cap having a rectangular-shaped recessed cavity in its top wall;

FIG. 8 is a sectional view like FIG. 2, illustrating a closure cap having a twist-off opener which is removable to provide a dispensing orifice in the cap and which is further adapted to be replaced therein to close the dispensing orifice; and FIG. 9 is a sectional view like FIG. 8, illustrating the manner in which the twist-off opener is inserted within the dispensing orifice to close it;

FIG. 10 is a top plan view of a closure cap having a twist-off opener exemplary of still another embodiment of the invention;

FIG. 11 is a partial sectional view of the closure cap of FIG. 10;

FIG. 12 is a top plan view of a closure cap having a twist-off opener which is adapted to provide a pour spout in the cap, when removed, and which is further adapted to receive the pour spout therein to re-seal it;

FIGS. 13 and 14 are partial sectional views of the closure cap of FIG. 12, illustrating the twist-off opener before it is removed and illustrating the same affixed to the pour spout respectively;

FIG. 15 is a sectional view of a closure cap exemplary of still another embodiment of the invention;

FIG. 16 is a plan view, on a reduced scale, of the closure cap of FIG. 15; and

FIG. 17 is a sectional view of still another closure cap exemplary of the invention.

Similar reference characters refer to similar parts throughout the several views of the drawing.

Referring now to the drawing, in FIG. 6 there is illustrated a pair of containers 10 which are stacked one atop the other. Each of the containers has a cap 12 removably affixed to it, and it may be noted that the upper container is seated upon and supported by the cap on the lower container. The cap 12, as fully described below, is preferably molded of plastic and includes a twist-off opener 14 (FIG. 2) which is positioned within a recessed cavity 16 formed in the top wall 18 of the cap 12 and which is easily removed to provide a dispensing aperture 20 in the cap, simply by twisting it with the fingers. The cap 12 is of a diameter such that it provides a substantial support surface for supporting a container seated atop it, so that the upper container, if fabricated of plastic, is not subject to damage, as in the past. Accordingly, the cap 12 overcomes each of the disadvantages and problems contributable to the caps used in the past, as discussed above, but still retains all of the advantages.

More specifically, the cap 12 is molded as an integral unit of plastic preferably rigid polystyrene or other plastic having similar characteristics and is of a hollow cylindrical construction, having a side wall 22 which has interior threads 24 formed thereon and a top wall 18. The top wall 18 is formed to provide the recessed cavity 16 which may be, for example, a conical-shaped recessed cavity, as illustrated in FIGS. 1–6, 8 and 9 or a rectangular-shaped cavity, as illustrated in FIG. 7. Other shapes also can be used so long as they function in the manner described below. The dispensing aperture 20 is formed in the top wall 18, at the apex of the cavity 16, and normally is closed or sealed by the twist-off opener 14.

The twist-off opener 14, in the embodiment illustrated in FIGS. 1–3, is in the form of a triangular-shaped wing having a small tubular neck 26 at its apex. The neck 26 is integrally affixed at the apex of the recessed cavity 16 in the top wall 18 of the cap, and the dispensing aperture 20 extends into it, as can be best seen in FIG. 2. The neck 26, in this case, only functions to close the dispensing aperture 20, and the thickness of the neck's wall is adjusted and adapted so as to leave a clean, substantially flush, break at the apex of the recessed cavity when the twist-off opener 14 is twisted off, as illustrated in FIG. 3. With this arrangement, any excess product which remains in the recessed cavity 16, after dispensing the product, will flow back into the container. It also may be noted that the height of the twist-off opener 14 is such that the opener is completely contained within the recessed cavity 16. Accordingly, the twist-off opener 14 will not engage or damage a container seated atop the cap, and of equal importance, the twist-off opener is substantially protected from damage or accidental removal during shipping or storage.

To open the container 10 to dispense the product, the twist-off opener 14 is merely gripped between the tips of two fingers and twisted to break it off. No additional opener means such as a knife or scissors is necessary.

With products where only a few drops are used, the container is tilted only a sufficient amount to dispense drops of the product and any excess amount is captured in the recessed cavity 16. The arrangement also functions in substantially the same manner, to provide a spill-proof or dripless cap.

In the embodiment illustrated in FIG. 4, the neck 26 of the cap 12 is lengthened and further is scored or otherwise weakened annularly about its periphery, as at 28, at a spaced distance from the apex of the recessed cavity 16. With this arrangement, when the twist-off opener 14 is twisted or otherwise broken off, a short, upstanding neck or pour spout 30 is left standing about the periphery of the dispensing orifice 20, through which the product can be dispensed. Pour spouts of this type advantageously are provided and used with certain types of products, such as lighter fluid and the like where a controlled stream of dispensed product is desirable.

In most cases, a twist-off opener 14 of the construction illustrated in FIGS. 1–3 is all that is necessary. With large size caps or for certain applications, however, a twist-off opener having, for example, four wings 32, as illustrated in FIG. 5 may be desired. Other numbers of wings and different configurations for the twist-off opener also can be used.

In FIGS. 8 and 9, there is illustrated a closure cap 36 having a twist-off opener 38 generally like the twist-off opener 14 illustrated in FIGS. 1–3. The twist-off opener 38, however, has a pair of extending wings 40 which are shaped so as to be insertable in the dispensing aperture 42 formed in the cap after the twist-off opener is broken off. In this fashion, the dispensing aperture can be re-sealed, as illustrated in FIG. 9.

In FIGS. 10–14, there are illustrated two closure caps 44 and 46 having twist-off openers 48 and 50, respectively, which also are adapted to re-seal the dispensing apertures 51 and 52 formed in the caps. The closure cap 44, as can be seen in FIGS. 10 and 11, is generally like the closure cap 12, however, its twist-off opener 48 is generally spherical-shaped and has an upstanding tip 53 integrally formed with it. The tip 53 is of a diameter such that it can be inserted within the dispensing aperture 51 of the cap 44 to re-seal it. The peripheral side wall of the twist-off opener 48 also preferably is serrated, as can be best seen in FIG. 10, so that the opener can be easily gripped and twisted with two fingers.

The closure cap 46 also is generally like the closure cap 12, however, its twist-off opener 50 is formed so as to provide a small pour spout 54 upstanding about the dispensing aperture 52 when it is broken off, like the pour spout 30 illustrated in FIG. 4. The twist-off opener 50 also has an upstanding wall 55 integrally formed on its top surface 56 which forms a cavity 57 of a size such that the pour spout 54 can be forcibly urged into it, to secure the twist-off opener 50 on the pour spout and to re-seal the latter, as illustrated in FIG. 14.

In FIGS. 15 and 16, there is illustrated still another closure cap 60 which has a twist-off opener 62 and which is further adapted to function in combination with a compressible plastic container 64 or the like to dispense a product from the container in the form of a stream or spray, as explained more fully below. The closure cap 60 has a generally cylindrical-shaped top portion 65 which flares outwardly and merges with a lower portion 66 having internal threads 67 formed on it for threadedly affixing the closure cap to the container 64. The top portion 65 has a tube attachment tail 68 integrally formed with it on its under surface 69 to which a dip tube 70 can be affixed. The dispensing aperture 71 extends through the tube attachment tail 68 and through the top portion 65 and terminates in the twist-off opener 62. Alternatively, the top portion 65 can be hollow and have a tube attachment tail integrally attached to the top wall beneath the twist-off opener 62. In this case, the dispensing aperture extends through the tube attachment tail and terminates in the twist-off opener.

A generally V-shaped trough 72 which slopes downwardly from the top to the lower edge of the top portion 65 is formed in the top wall of the closure cap 60, and provides opposed top walls 73 and 74 which are mirror images of one another. The dispensing aperture 71 and the twist-off opener 62 both are provided at the apex of the V-shaped trough 72, preferably centrally of the closure cap 60, as illustrated in FIG. 16. A top wall of the above-described construction is preferred because of the ease with which it can be molded, however, other configurations also can be provided, if desired.

A dip tube 70 is affixed to the tube attachment tail 68, by forcibly inserting the latter into the end of the dip tube. The dip tube 70 preferably extends to the bottom of the plastic container 64 so that substantially all of the product can be removed from the container while holding it in an upright position.

To dispense the product from the container 64 which, as indicated above, preferably is a compressible plastic container, the twist-off opener 62 is removed, as by twisting it, to provide an opening into the dispensing aperture 71. When the container 64 is held upright and its sides are squeezed, the product is forced to flow through the dip tube 70 and is sprayed out of the closure cap 60, under pressure, through the dispensing aperture 71. Since the dip tube 70 extends to the bottom of the container 64, substantially all of the product can be easily dispensed from the container.

In FIG. 17, there is illustrated still another closure cap 80 having a flat top wall 82 and a side wall 83 having a tapered or angularly disposed portion 84, in which is formed a conical-shaped recessed cavity 86. Disposed within the recessed cavity 86 is a generally cylindrical-shaped twist-off opener 88 having serrations formed in its peripheral side wall. It is apparent that any one of the other above-described twist-off openers also can be used in place of the opener 88, if desired. A dispensing aperture 90 extends through the bottom wall 92 of the recessed cavity 86 and terminates in the twist-off opener 88.

A product can be dispensed from a container to which the closure cap 80 is affixed, by removing the twist-off opener 88 to provide an opening into the dispensing aperture 90, in the above described manner. The angularly disposed recessed cavity 86 permits the product to be dispensed while holding the container in a substantially horizontal position. The flat top wall 82 permits the containers to be stacked atop one another without damaging the upper container, since it provides a flat support surface of substantial size or area.

From the above description of the closure caps, it can be seen that the twist-off openers can be any one of a number of different shapes or configurations and, furthermore, can be provided in the top or side wall of the caps. Also, the small tubular neck 26 at the apex of the triangular-shaped wing forming the opener of the cap 10 of FIGS. 1-3 can be eliminated, by forming the wing with a sufficient thickness such that the dispensing aperture 20 can extend through the top wall 18 of the cap and terminate at the connection point between the wing and the cap, and yet be sealed. Preferably the dispensing aperture extends a short distance into the wing. The thickness of the wing, however, should not be so great that the wing cannot be twisted or otherwise broken off relatively easily.

The caps also can be molded inexpensively, preferably of rigid polystyrene or other material having similar characteristics. In particular, the material should be sufficiently rigid so that the twist-off opener can be broken off of the cap without extending a great deal of effort. While generally referred to as a twist-off opener, it is apparent that the opener can be otherwise broken off by, for example, applying a sufficient lateral force against it, in one direction or another.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A cap for a container having a dispensing aperture in the form of a bore extending through the top wall of said cap, said dispensing aperture being sealed by an opener which is integrally formed with said cap and which is severable from said cap without the use of additional means such as a knife to open said dispensing aperture to permit the contents of said container to be dispensed therefrom through said dispensing aperture, said cap being molded as an integral unit of plastic and comprising a body portion having a cylindrical-shaped side wall with interlocking means on the interior peripheral surface thereof for affixing said cap to the open end of said container to close it and a top wall in the form of a recessed cavity which slopes to an apex substantially disposed in axial alignment with said dispensing aperture, said opener being disposed within said recessed cavity and having a height proportionately related to the depth of said recessed cavity such that said opener is completely contained within said recessed cavity to thereby protect said opener from damage and the accidental removal thereof during shipping and storage, said bore forming said dispensing aperture extending through said top wall into said opener so as to provide a frangible connection between said opener and the remainder of said cap, said opener being severable from said cap at least by twisting it to sever said opener at said frangible connection to open said bore forming said dispensing aperture.

2. The cap of claim 1, wherein said recessed cavity is generally conical shaped so as to slope upwardly and outwardly from the apex thereof to intersect said side wall at an angle.

3. The cap of claim 1, wherein said opener comprises a generally triangular-shaped member integrally affixed to said cap at its apex.

4. The cap of claim 1, wherein said opener comprises a body portion having a plurality of wing-like members extending outwardly therefrom.

5. The cap of claim 1, wherein said opener is formed to close said dispensing orifice after it is severed from said cap.

6. The cap of claim 1, wherein said opener comprises a lengthened neck portion which is weakened annularly about its periphery to enhance breaking of said neck portion at said weakened point, said dispensing aperture extending through said neck portion, said weakened point being spaced from the base of said recessed cavity so that a pour spout is formed about the entrance to said dispensing aperture when said opener is severed from said cap.

7. The cap of claim 6, wherein said opener further has a cavity formed in it for receiving said pour spout, whereby said dispensing aperture can be resealed by affixing said opener to said pour spout by inserting the latter into said cavity.

8. The cap of claim 1, wherein said top wall thereof is angularly disposed and has a tube attachment tail integrally formed therein, said dispensing aperture extending through said tube attachment tail, a dip tube affixed to said tube attachment tail, whereby a product can be sprayed from said closure cap under pressure when affixed to a flexible container.

References Cited

UNITED STATES PATENTS

| | | | |
|---|---|---|---|
| 1,327,190 | 1/1920 | Bigoney | 222—541 |
| 2,742,202 | 4/1956 | Dresden et al. | 222—541 |
| 2,796,205 | 6/1957 | Kuzma | 222—464 |
| 3,124,280 | 3/1964 | Stull | 222—541 |
| 3,322,297 | 5/1967 | Stolle et al. | 220—27 |

ROBERT B. REEVES, Primary Examiner

NORMAN L. STACK, JR., Assistant Examiner